United States Patent
Fraser et al.

(10) Patent No.: US 8,527,195 B2
(45) Date of Patent: Sep. 3, 2013

(54) METHOD TO DYNAMICALLY SELECT A ROUTING SERVICE OPTION

(75) Inventors: Ronald W. Fraser, Lake Orion, MI (US); Carl W. Shonk, Mayville, MI (US); Mark J. Glaza, Warren, MI (US)

(73) Assignee: General Motors LLC., Detroit, MI (US)

( * ) Notice: Subject to any disclaimer, the term of this patent is extended or adjusted under 35 U.S.C. 154(b) by 2916 days.

(21) Appl. No.: 11/014,498

(22) Filed: Dec. 16, 2004

(65) Prior Publication Data

US 2006/0136122 A1 Jun. 22, 2006

(51) Int. Cl.
- *G01C 21/00* (2006.01)
- *G01C 21/34* (2006.01)
- *G08G 1/123* (2006.01)

(52) U.S. Cl.
USPC ........... 701/410; 701/413; 701/416; 701/420; 701/428

(58) Field of Classification Search
USPC .................. 701/202, 209, 211, 213; 716/12
See application file for complete search history.

(56) References Cited

U.S. PATENT DOCUMENTS

| | | | |
|---|---|---|---|
| 5,899,956 A * | 5/1999 | Chan | 701/32.2 |
| 6,169,955 B1 * | 1/2001 | Fultz | 701/427 |
| 6,535,743 B1 * | 3/2003 | Kennedy et al. | 455/456.1 |
| 6,643,587 B2 | 11/2003 | Brodie | |
| 6,820,001 B2 * | 11/2004 | Norimoto | 701/428 |
| 6,853,912 B2 * | 2/2005 | Han | 340/995.15 |
| 6,901,330 B1 * | 5/2005 | Krull et al. | 701/431 |
| 7,061,897 B2 * | 6/2006 | Theimer | 370/338 |
| 2003/0158657 A1 * | 8/2003 | Agnew et al. | 701/208 |
| 2003/0187573 A1 * | 10/2003 | Agnew et al. | 701/201 |
| 2004/0024522 A1 * | 2/2004 | Walker et al. | 701/210 |
| 2006/0031007 A1 * | 2/2006 | Agnew et al. | 701/204 |

* cited by examiner

Primary Examiner — Khoi Tran
Assistant Examiner — Jorge Peche
(74) Attorney, Agent, or Firm — Leydig, Voit & Mayer, Ltd.

(57) ABSTRACT

A method of dynamically selecting a routing service including receiving a route request at a call center from a telematics unit via a wireless connection, determining a vehicle communication configuration responsive to the request, determining map data availability responsive to the request and selecting a routing service option based on the vehicle communication configuration determination and the map data availability determination.

22 Claims, 6 Drawing Sheets

METHOD TO DYNAMICALLY SELECT A ROUTING SERVICE OPTION

FIELD OF THE INVENTION

This invention relates generally to a dynamic selection of routing in a telematics system. In particular, the invention relates to a method, system and computer usable medium for dynamically determining routing availability among several routing service options.

BACKGROUND OF THE INVENTION

The opportunity to personalize features in a mobile vehicle is ever increasing as the automobile is being transformed into a communications and entertainment platform as well as a transportation platform. Many new cars will be installed with some type of telematics unit to provide wireless communication and location-based services. These services may be accessed through interfaces such as voice-recognition computer applications, touch-screen computer displays, computer keyboards, or a series of buttons on the dashboard or console of a vehicle.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

For example, traffic and driving directions may be accessed through a voice portal that uses incoming number identification to generate location information based on the area code or prefix of the phone number, or to access location information stored in a user's profile associated with the phone number. Users may be prompted to enter more details through a voice interface. Other examples are web and wireless portals that offer location-based services such as maps and driving directions where the user enters both a start and end addresses. Some of these services may have a voice interface.

One method of delivering routing services includes an advisor at a call center providing verbal directions to a user after the user provides the origination and destination location's to the advisor. The user is required to remember all the directions received from the advisor. It is sometimes difficult for the user to recall complex directions. In that case, the user can write down the directions and refer to the written directions while driving to the destination location. Reading directions while driving may have unintended consequences.

Another method of delivering routing services includes receiving packet data from an off-board navigation server. The telematics unit uses the packet data to establish a point-to-point wireless session with the off-board navigation server to obtain real-time directions. The directions are displayed in the vehicle as each turn is about to be implemented. In some cases, the map database in the off-board navigation server does not include needed data for both the origination and destination locations. In some cases, the packet data is corrupted during delivery so the point-to-point wireless session with the off-board navigation server cannot be established.

On-board navigation units include an on-board navigation database that was previously downloaded, i.e. from a DVD, into a memory in the on-board navigation unit. In some cases, the on-board navigation database of the on-board navigation unit does not include both the origination and destination locations. This is not uncommon since the on-board map database is generally not updated as frequently as the map database in the off-board navigation server. However, the on-board navigation unit may be the preferred method to obtain directions, if the on-board database includes both the origination and destination locations, since data delivery problems are not an issue.

On-board navigation units may also have the option to download map data from a map database in the call center to obtain directions to a destination location. In this case, the data for the directions is downloaded via a wireless connection to the on-board navigation unit in the vehicle. The map database in the call center may not include both the origination and destination locations although the call center map databases are generally updated more frequently than the on-board navigation database. As with the off-board navigation service option, data delivery can become an issue.

In a conventional route delivery, a user who requests directions is provided with a first routing service. If the first routing service fails due to unavailability or inaccuracy due to data errors, a second routing service option is provided. If the second routing service option fails, a third routing service option is provided. In the event that there is one or more failure of one or more successive service options, the user is required to wait for the failures to occur before a successful routing is provided.

It is desirable, therefore, to provide a method, system and computer usable medium that dynamically selects a routing service option from among more than one routing service option by monitoring the decision points in which availability of the routing service option is determined. It is further desirable that a user is not required to wait for a routing service option to fail before being provided with a successful routing option.

SUMMARY OF THE INVENTION

One aspect of the present invention provides a method of dynamically selecting a routing service including receiving a route request at a call center from a telematics unit via a wireless connection, determining a vehicle communication configuration responsive to the request, determining map data availability responsive to the request and selecting a routing service option based on the vehicle communication configuration determination and the map data availability determination.

Another aspect of the present invention provides a system to determine deliverability of navigation service including means for receiving a route request at a call center from a telematics unit via a wireless connection, means for determining a vehicle communication configuration responsive to the request, means for determining map data availability responsive to the request and means for selecting a routing service option based on the vehicle communication configuration determination and the map data availability determination.

A third aspect of the present invention provides a computer readable medium storing a computer program including computer readable code for receiving a route request at a call center from a telematics unit via a wireless connection, determining a vehicle communication configuration responsive to the request, determining map data availability responsive to the request and selecting a routing service option based on the determinations of vehicle communication configuration and the map data availability.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
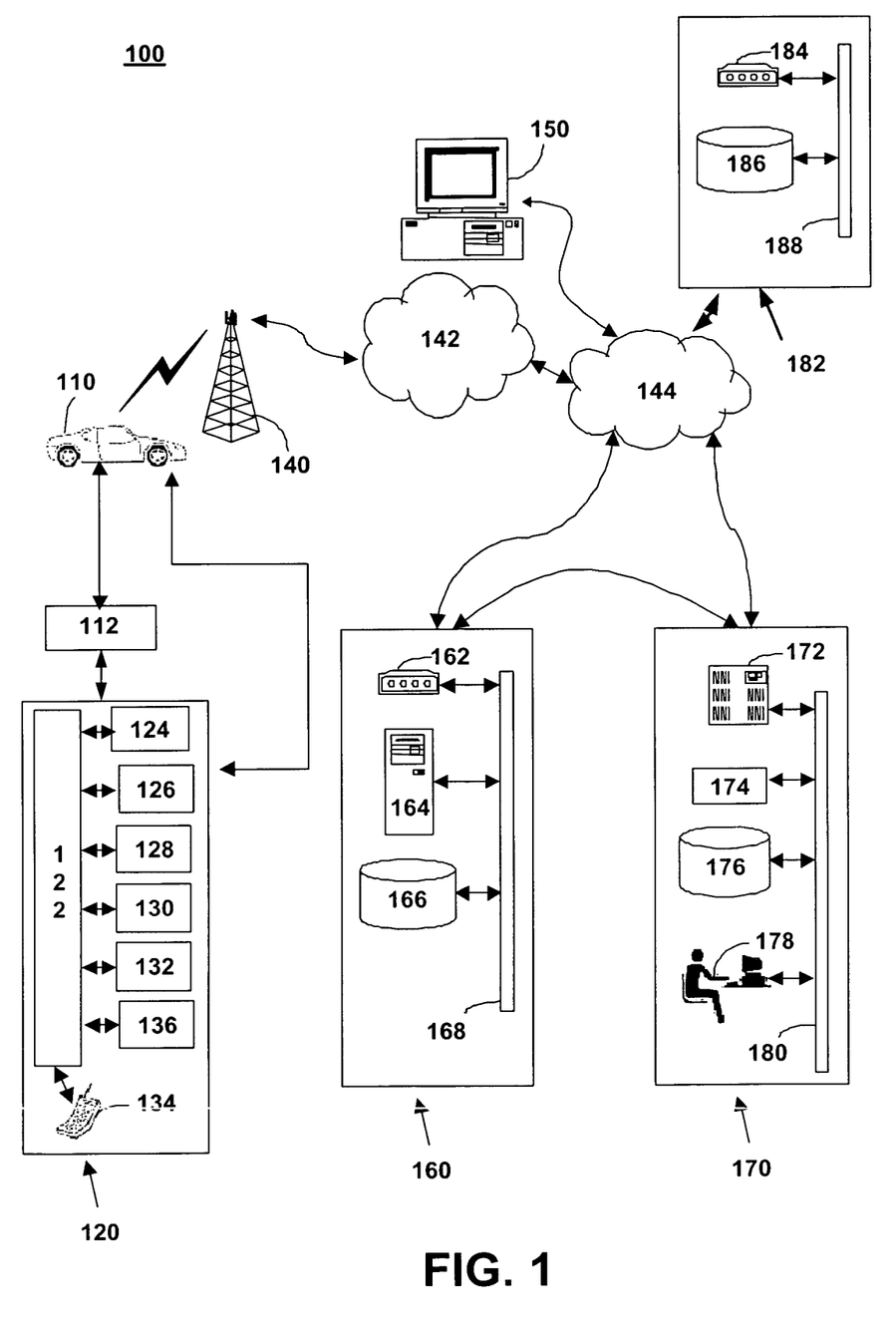
FIG. 1 is a schematic diagram of a system for determining deliverability of navigation service to a telematics system in a mobile vehicle.

FIG. 1 is a schematic diagram of a system 100 for determining deliverability of navigation service to a telematics system in a mobile vehicle in accordance with the present invention. Mobile vehicle communication system (MVCS) 100 includes a mobile vehicle communication unit (MVCU) 110, a vehicle communication network 112, a telematics unit 120 one or more wireless carrier systems 140, one or more communication networks 142, one or more land networks 144, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

Vehicle communication network 112 sends signals to various units of equipment and systems (detailed below) within MVCU 110 to perform various functions such as unlocking a door, opening the trunk, setting personal comfort settings, and calling from telematics unit 120. Vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, an on-board navigation unit 136, and an embedded or in-vehicle mobile phone 134. In other embodiments, telematics unit 120 may be implemented without one or more of the above listed components, such as, for example an in-vehicle mobile phone 134 or speakers 132. Telematics unit 120 may include additional components not relevant to the present discussion.

Processor 122 is implemented as a microcontroller, microprocessor, controller, host processor, or vehicle communications processor. In one embodiment, processor 122 is a digital signal processor (DSP). In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from a one or more GPS satellite broadcast systems (not shown). In-vehicle mobile phone 134 is a cellular-type phone, such as, for example an analog, digital, dual-mode, dual-band, multi-band, multi-mode or multi-band cellular phone.

Processor 122 executes various computer programs that control programming and operational modes of electronic and mechanical systems within MVCU 110. Processor 122 controls communications (e.g. call signals) between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from processor 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, call center 170, and off-board navigation server 182. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

An off-board navigation server 182 includes one or more data modems 184, one or more databases 186, and a network system 188. Off-board navigation server 182 is connected directly by wire to call center 170, or connected by phone lines to land network 144, which is connected to call center 170. In an example, off-board navigation server 182 is connected to call center 170 utilizing an IP network. In this example, both components, off-board navigation server 182 and call center 170, are connected to land network 144 utilizing the IP network. In another example, off-board navigation server 182 is connected to land network 144 by one or more data modems 184. Land network 144 sends digital data to and from modem 184. Land network 144 transmits data communications between off-board navigation server 182 and call center 170. The databases 186 in off-board navigation server 182 contain maps correlated to GPS signals. In one embodiment, the map data is located in databases external to the off-board navigation server 182.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

Communications between the elements of system 100 may be analog transmissions, digital transmissions, or packet data transmissions over a network.

Figure 2:
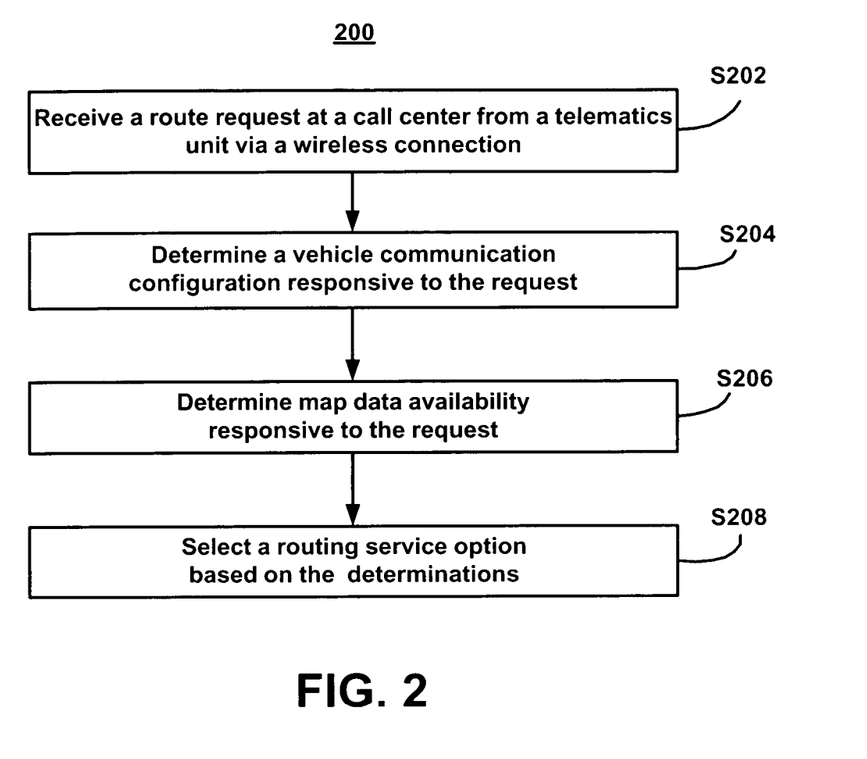
FIG. 2 illustrates a flowchart representative of a first embodiment of a method of dynamically selecting a routing service in accordance with the present invention.

FIG. 2 illustrates a flowchart 200 representative of a first embodiment of a method of dynamically selecting a routing service in accordance with the present invention. In one embodiment, MVCS 100 of FIG. 1 is used to determine deliverability of navigation services to the telematics unit 120 in the MVCU 110. The MVCS 100 has a computer readable medium storing a computer program that includes computer readable code to receive a route request at the call center 170 from the telematics unit 120 via a wireless connection, to determine a vehicle communication configuration responsive to the request, to determine map data availability responsive to the request and to select a routing service option based on the vehicle communication configuration determination and the map data availability determination.

During stage S202, the call center 170 receives a route request from a telematics unit 120 via a wireless connection. The telematics unit 120 sends the route request to the call center 170 via one or more wireless carrier systems 140, one or more communication networks 142, or one or more land networks 144. A route request is a request from a user of a telematics unit 120 for driving directions from an origination location to a destination location. In one embodiment, a route request is initiated with a button push and a verbal command, "Plan route." In another embodiment, a route request is initiated with a button push.

The call center receives an origination location. The origination location is obtained, in one embodiment, from a signal generated by GPS unit 126 including the origination latitude and the origination longitude, as well as a time stamp. In another embodiment, the origination location is obtained by the call center from a user with a vocal command or at least one button push.

The call center then receives a destination location. In one embodiment, the call center receives the destination location in response to a request from the call center to the vehicle. The destination location is provided with a vocal response or with a button push. For example, after the communication services advisor 178 in the call center 170 responds to the button push by asking "What is your destination?" the user tells the destination location to a communication services advisor 178. The call center 170 has the capability to determine a destination geocode, which includes the destination longitude and destination latitude. The communication services manager 174 can retrieve data for the destination geocode from the communication services databases 176. In one embodiment, the communication services manager 174 retrieves data for the destination geocode from the off-board navigation server 182. Communication services database includes geographic information systems (GIS) information, Point of Interest (POI) information, or both, in various embodiments.

During stage S204, the call center 170 determines a vehicle communication configuration responsive to the request in order to determine what routing service options are available to the MVCU 110. For example, the call center 170 may perform a capability check comprised of testing the integrity of the MVCU 110 positioning system components, such as the GPS receiver (FIG. 1, 126). The call center 170 determines what routing service capabilities are installed in or downloadable to the MVCU 110. The call center 170 monitors a plurality of selection decision points to determine if the MVCU 110 is configured for various routing service options, as described below with reference to stage S302 in flowchart 300 in FIG. 3. A vehicle communication configuration is defined as a hardware and software configuration within the MVCU 110 to provide communication with systems external to the MVCU 110. For example, a vehicle communication configuration includes the hardware and software to receive packet data to initiate a communication with an off-board navigation server 182.

During stage S206, the call center 170 determines map data availability responsive to the received route request.

During stage S208, the call center 170 selects a routing service for the user based on the determinations made during stages S204 and S206. The routing service options include one or more off-board navigation servers 182, one or more on-board navigation units 136 and verbal directions from a communication services advisor 178 at the call center 170. Other routing service options are possible. An exemplary method of selecting a routing service is described below with reference to flowcharts 300, 400 and 500 in FIGS. 3-5.

Figure 3:
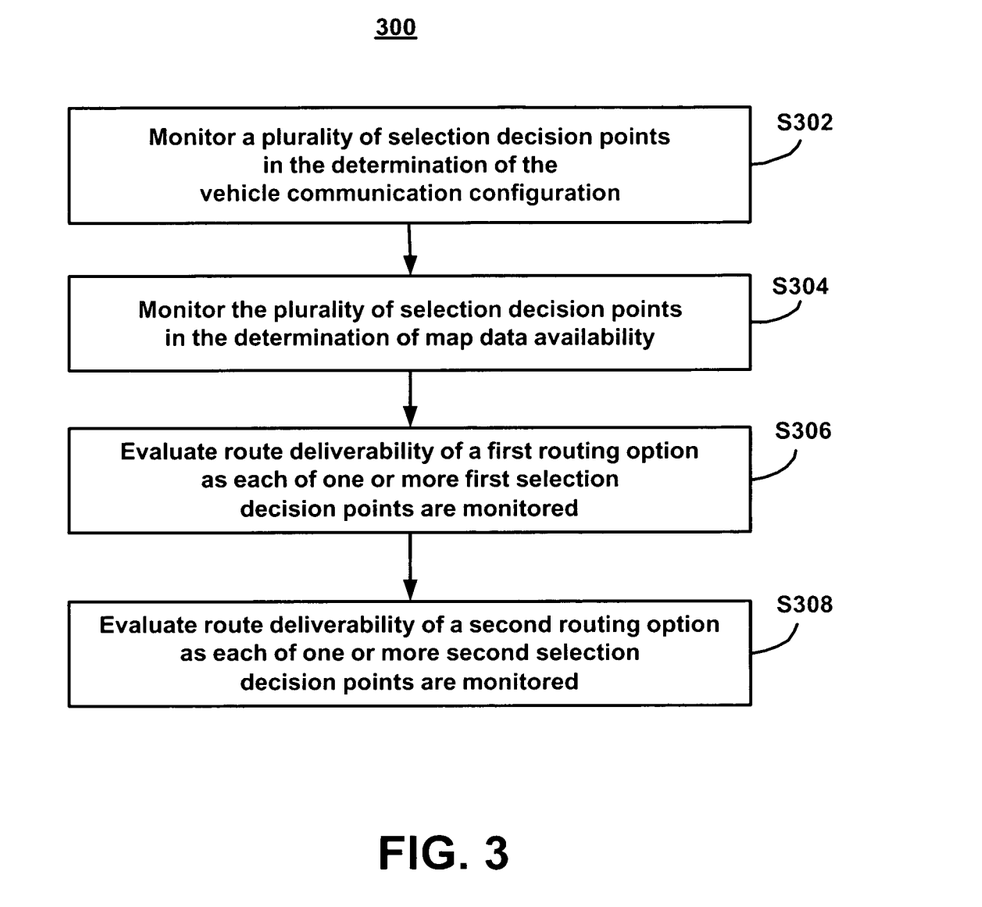
FIG. 3 illustrates a flowchart representative of a method of determining vehicle communication configuration and map data availability in accordance with the present invention.

FIG. 3 illustrates a flowchart 300 representative of a method of determining vehicle communication configuration and map data availability in accordance with the present invention. In the method, the call center 170 in the MVCS 100 provides the monitoring a plurality of selection decision points in the determination of the vehicle communication configuration and in the determination of the map data availability to evaluate a route deliverability of a first routing service option. The call center 170 accesses computer readable code to perform the described functions.

During stage S302, the call center 170 monitors a plurality of selection decision points in the determination of the vehicle communication configuration. There is a flowchart for each of the routing service options and a portion of each flowchart is dedicated to determining if a vehicle communication configuration is available for the routing service option. Every decision point in the flowcharts is a selection decision point and is monitored by the call center 170. Every decision point that is required to determine if a vehicle communication configuration is available is a selection decision point in the determination of the vehicle communication configuration.

The call center 170 requests input from the telematics unit 120 and/or the off-board navigation server 182 for some selection decision points as required. The call center 170 evaluates the response to each request as it is received. The selection decision points are sequential in time as dictated by the flowcharts for the routing service options.

In some embodiments, the call center 170 requests input at one time for several selection decision points. This request for information regarding multiple selection decision points from telematics unit 120 and/or the off-board navigation server 182 saves the time and bandwidth required to set up a transmission link over one or more wireless carrier systems 140, one or more communication networks 142 and one or more land networks 144. In this case, the computer readable code for the flowchart instructs the call center 170 to request the required information at the start of the program.

Likewise, the responses from the telematics unit 120 and/or the off-board navigation server 182 can include input needed at several selection decision points. In this case, the call center 170 evaluates the input received for each selection decision point in the sequential order of the selection process defined by the flowchart.

The plurality of selection decision points in the determination of vehicle communication configuration include one or more of the following: determining whether an off-board navigation server 182 is enabled in a MVCU 110; determining whether a transport mechanism is available in the MVCU 110; and determining whether an on-board navigation unit 136 is enabled in the MVCU 110.

For some embodiments in the determination of vehicle communication configuration, the call center 170 requests and receives data from the telematics unit 120 to determine if the MVCU 110 is configured with an on-board navigation unit 136. Likewise, for some embodiments in the determination of vehicle communication configuration, the call center 170 requests and receives data from the telematics unit 120 to determine if the MVCU 110 is enabled to communicate with an off-board navigation server 182. If telematics unit 120 is enabled to communicate with an off-board navigation server 182, the telematics unit 120 also checks for availability of a physical layer transport mechanism, such as, the IXRTT CDMA data network, which the telematics unit 120 needs to communicate with the off-board navigation server 182. If the physical layer connection is available, the telematics unit 120 can communicate with the network system 188 of off-board navigation server 182 through a communication system, including one or more wireless carrier systems 140, one or more communication networks 142 and one or more land networks 144. In that case, the MVCU 110 receives a packet data message from the call center 170, wherein the call center 170 utilizes said packet data message to establish a packet data connection with the MCVU 110.

During stage S304, the call center 170 monitors the plurality of selection decision points in the determination of map data availability. As described above with reference to stage S302, there is a flowchart for each of the routing service options. A portion of each flowchart is dedicated to determining if map data is available for the respective routing service option. The decision points in each flowchart that are dedicated to determining if map data is available are the of selection decision points in the determination of map data availability.

The call center 170 requests input from the telematics unit 120 and/or the off-board navigation server 182 for each selection decision point in the determination of map data availability. The call center 170 evaluates the response to each request in the sequential order of the selection as dictated by the flowcharts for the routing service options.

The plurality of selection decision points in the determination of map data availability include one or more of the following: determining if an off-board navigation server 182 has an origin geocode including a longitude and a latitude associated with a MVCU 110 at the time of the request; determining if an on-board navigation unit 136 has the origin geocode; determining if the off-board navigation server 182 has a destination geocode including a longitude and a latitude associated with a vehicle destination; determining if the on-board navigation unit 136 has the destination geocode; determining if the off-board navigation server 182 can calculate the route, determining if the on-board navigation unit 136 can calculate the route; and determining if data to initiate a packet session is accurate for the MVCU 110.

During stage S306, the call center 170 evaluates route deliverability of a first routing service option as each of one or more first selection decision points are monitored. The evaluation occurs in synchronicity with the monitoring. At any selection decision point, if the first routing service is deemed unavailable, then the call center 170 does not review any of the remaining selection decision points regarding the suitability of the first routing service.

The computer readable code for selecting the first routing service option based on the evaluation of the first routing service option deliverability includes a processing sequence in which the first selection decision points are considered. The processing sequence can vary based on the computer readable code for monitoring a plurality of selection decision points in the determination of the vehicle communication configuration, for monitoring the plurality of selection decision points in the determination of the map data availability, and for evaluating a route deliverability of a first routing service option as each of one or more first selection decision points are monitored, wherein the first selection decision points include at least one of the plurality of selection decision points.

One routing service option is determined to be the preferred or first routing service option. In the exemplary method described below with reference to flowcharts 400, 500 and 600 in FIGS. 4-6, one or more off-board navigation servers 182 is the preferred routing service option.

During stage S308, the call center 170 evaluates route deliverability of a second routing service option as each of one or more second selection decision points are monitored. Again, the evaluation occurs in synchronicity with the monitoring. At any selection decision point, if the second routing service is deemed unavailable, then the call center 170 does not review any of the remaining selection decision points regarding the suitability of the second routing service.

The computer readable code for selecting the second routing service option is based on the evaluation of the first routing service option deliverability and includes a processing sequence in which the second selection decision points are considered in relation to the first selection decision points. The processing sequence can vary, based on the computer readable code for monitoring the plurality of selection decision points in the determination of the vehicle communication configuration, for monitoring the plurality of selection decision points in the determination of the map data availability, and for evaluating a route deliverability of a first and second routing service option as each of one or more first and second selection decision points are monitored.

In one embodiment, the first routing service option is one or more off-board navigation servers 182 and the second routing service option is verbal directions from a communication services advisor 178. In another embodiment, the first routing service option is one or more on-board navigation units 136 and the second routing service option is verbal directions from a communication services advisor 178. In yet another embodiment, the first routing service option is one or more on-board navigation units 136 and the second routing service option is one or more off-board navigation servers 182.

An exemplary method of selecting a routing service is described below with reference to flowcharts 400, 500 and 600 in FIGS. 4-6. The system used to determine deliverability of navigation services to the telematics unit 120 in the MVCU 110 is the MVCS 100 of FIG. 1 including the telematics unit 120, the call center 170, and the off-board navigation server 182. Flowcharts 300, 400 and 500 are described for the case in which the first routing service option is the off-board navigation server 182, the second routing service option is the on-board navigation unit 136 and the third routing service option is the verbal directions from the communication services advisor 178.

Figure 4:
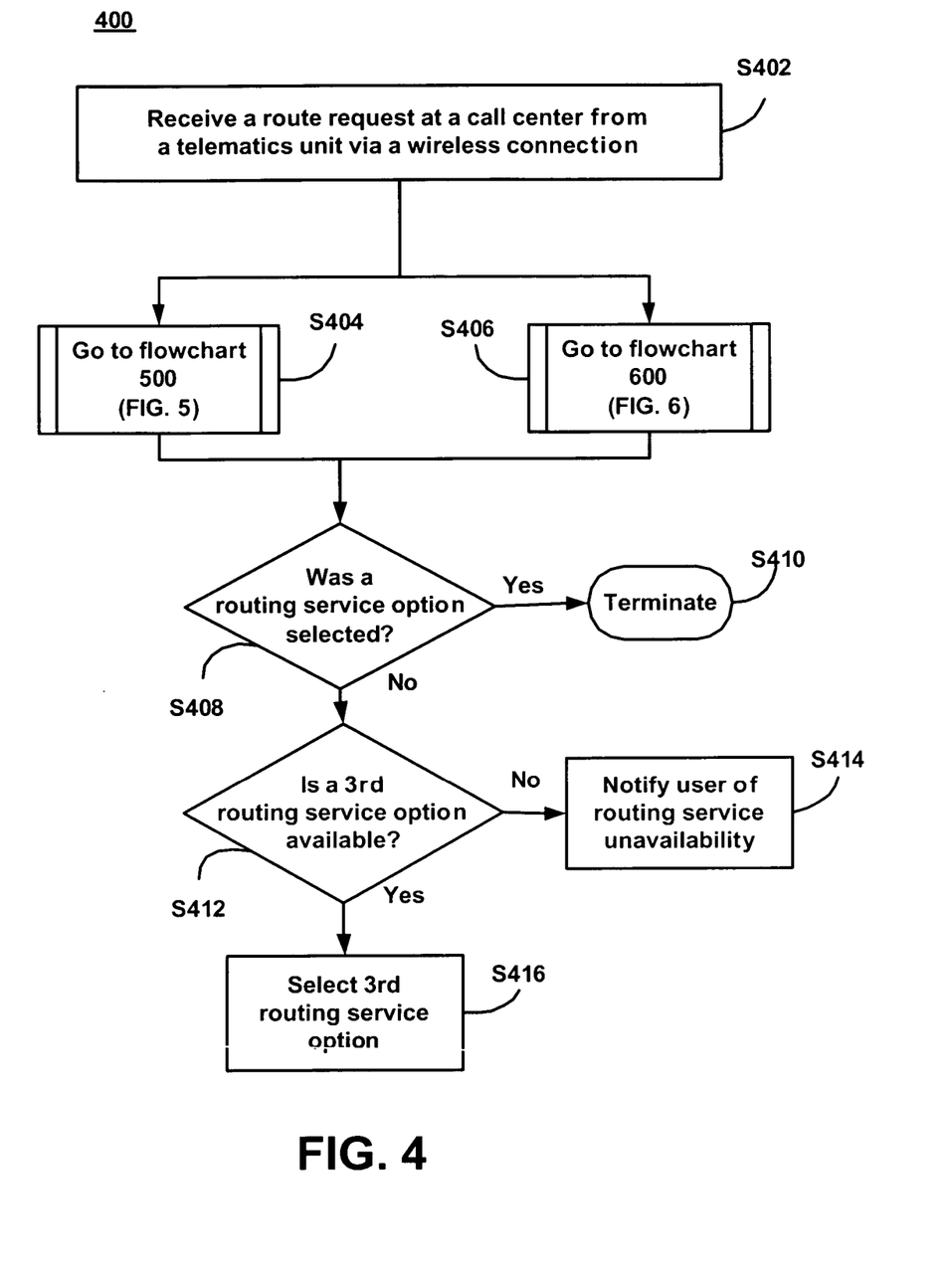
FIG. 4 illustrates a flowchart representative of a first embodiment of a method of determining routing service availability in accordance with the present invention.

FIG. 4 illustrates a flowchart 400 representative of a first embodiment of a method of determining routing service availability in accordance with the present invention.

Stage S402 is identical to stage S202 described above with reference to flowchart 200 in FIG. 2. During stage S402, the call center 170 receives a route request from a telematics unit 120 via a wireless connection.

The flowchart 400 then proceeds along two paths and stages S404 and S406 occur concurrently. During stage S404, the process of flowchart 500 in FIG. 5 is implemented. During stage S406, the process of flowchart 600 in FIG. 6 is implemented. In one embodiment, the stage S406 is sequential to and not concurrent with stage S404. Before describing stages S408-S416 in flowchart 400, the flowcharts 500 and 600 are described.

Figure 5:
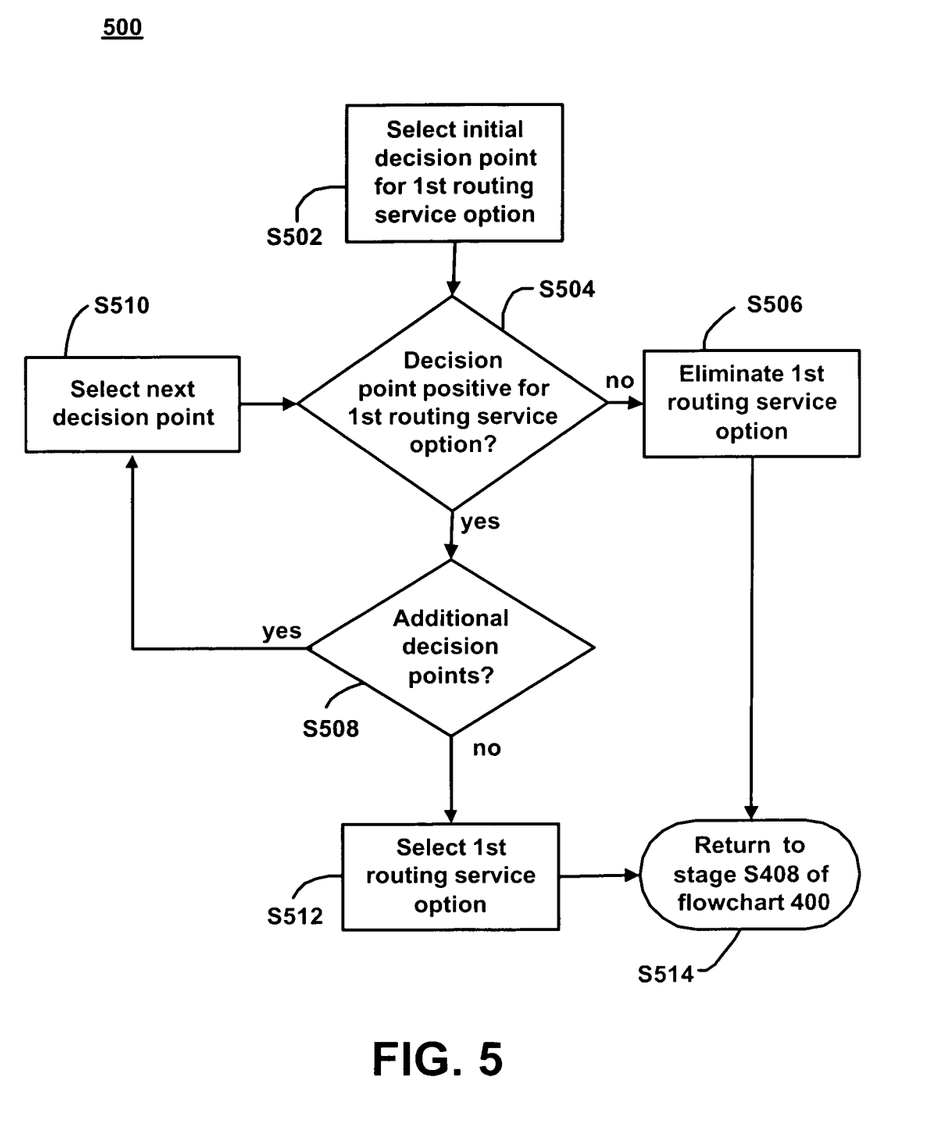
FIG. 5 illustrates a flowchart representative of a first portion of the method of FIG. 4.

FIG. 5 illustrates a flowchart 500 representative of a first portion of the method of FIG. 4, in which the call center 170 monitors the input regarding the availability of the first routing service option. As described in flowchart 500, the call center 170 in the MVCS 100 provides for selecting the first routing service option based on the evaluation of the first routing service option deliverability. In flowchart 500, the call center 170 evaluates route deliverability of a first routing service option as each of one or more first selection decision points are monitored. The first selection decision points are those decision points required to determine if the first routing service option is viable. The first selection decision points include at least one of the plurality of selection decision points described above with reference to stages S302 and S304 of flowchart 300 in FIG. 3.

For this exemplary case, the first routing service option is the off-board navigation server 182, so the first selection decision points include the following: determining whether communication with an off-board navigation server 182 is enabled in a MVCU 110; determining whether a transport mechanism for point-to-point wireless communication with the off-board navigation server 182 is available in the MVCU 110; determining if the off-board navigation server 182 has an origin geocode; determining if the off-board navigation server 182 has a destination geocode; determining if the off-board navigation server 182 can calculate the route and determining if data received from the off-board navigation server 182 to initiate a packet session is accurate for the MVCU 110 at the time of receipt.

During stage S502, the call center 170 selects an initial decision point for the first routing service option. The decision points for the first routing service option described with reference to flowchart 500 are the first selection decision points. In an exemplary case, the initial decision point can be determining whether an off-board navigation server 182 is enabled in a MVCU 110. During stage S504, the call center 170 determines if the decision point is positive for the first routing service option. A negative determination during stage S504 indicates that the first routing service option is not viable and the flow proceeds to stage S506 where the first routing service option is eliminated. For example, if the off-board navigation server 182 is not enabled in a MVCU 110, then using the off-board navigation server 182 to receive a route is not possible and the off-board navigation server 182 is eliminated as a routing service option. The flow proceeds to stage S514 where the flow returns to stage S408 of the originating flowchart 400.

A positive determination, during stage S504, indicates that the first routing service option is still viable and the flow proceeds to stage S508. During stage S508, the call center 170 determines if additional decision points must be evaluated before selecting the first routing service option. An additional decision point for the first routing service option can be determining if the off-board navigation server 182 has an origin geocode.

If it is determined during stage S508 that there are no additional decision points to be evaluated, the flow proceeds to stage S512 where the first routing service option is selected. The flow proceeds to stage S514 where the flow returns to stage S408 of the originating flowchart 400.

If it is determined during stage S508 that there are one or more additional decision points to be evaluated, the flow proceeds to stage S510 where the call center 170 selects the next decision point and the flow proceeds back to stage S504. During stage S504, the call center 170 determines if the currently selected decision point for the first routing service option is positive.

In the exemplary case in which the first routing service option is the off-board navigation server 182, the next decision point can determine if the off-board navigation server 182 has an origin geocode. If the off-board navigation server 182 does not have the origin geocode, then the off-board navigation server 182 cannot deliver the requested route and the off-board navigation server 182 is eliminated as a routing service option.

The flow continues to cycle through stages S504, S508 and S510 until all the required decision points for the first routing service option are evaluated. If the call center 170 determines that any decision point is negative, the flow proceeds to stage S506 where the first routing service option is eliminated and then the flow proceeds to of the originating flowchart 400 as described above. If the call center 170 determines that all the decision points are positive, the flow proceeds to stage S512 where the first routing service option is selected and the flow proceeds to the originating flowchart 400 as described above.

Figure 6:
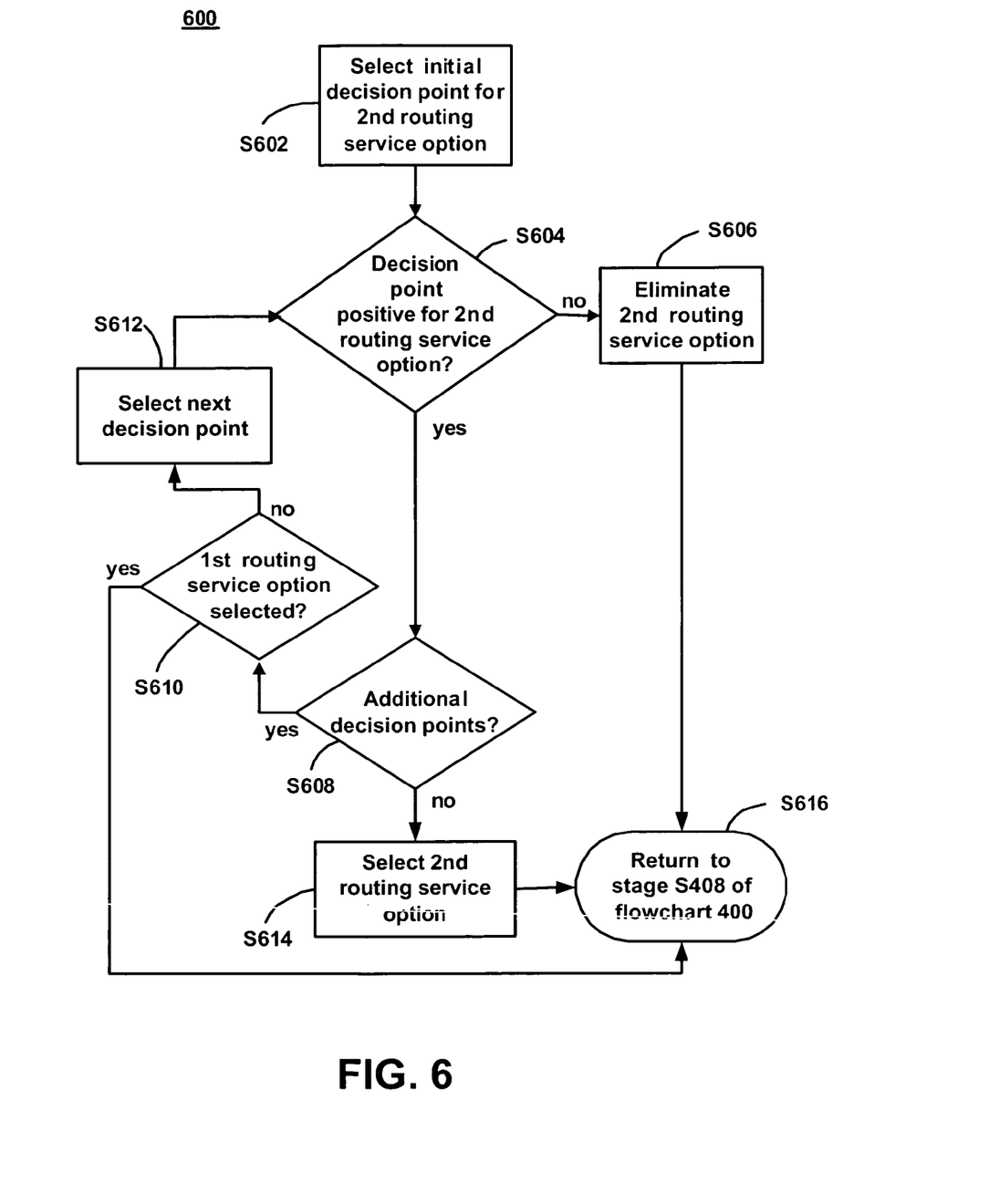
FIG. 6 illustrates a flowchart representative of a second portion of the method of FIG. 4.

FIG. 6 illustrates a flowchart 600 representative of a second portion of the method of FIG. 4, in which the call center 170 monitors the input regarding the availability of a second routing service option. As described in flowchart 600, the call center 170 in the MVCS 100 provides for selecting a second routing service option based on the evaluation of the first routing service option deliverability and the second routing service option deliverability.

In flowchart 600, the call center 170 evaluates the route deliverability of a second routing service option as each of one or more second selection decision points are monitored. The second selection decision points are those decision points required to determine if the second routing service option is viable. The second selection decision points include at least one of the plurality of selection decision points described above with reference to stages S302 and S304 of flowchart 300 in FIG. 3.

The second selection decision points are distinct from the first selection decision points. In one embodiment, second selection decision points and the first selection decision points share at least one common selection decision point. For example, a shared selection decision point can be determining if the user indicated a preferred routing service option with the route request.

For this exemplary case, the second routing service option is the on-board navigation unit 136, so the second selection decision points include the following: determining whether an on-board navigation unit 136 is enabled in the MVCU 110; determining if an on-board navigation unit 136 has the origin geocode; determining if the on-board navigation unit 136 has the destination geocode; and determining if the on-board navigation unit 136 can calculate the route.

During stage S602, the call center 170 selects an initial decision point for the second routing service option. The decision points for the second routing service option described with reference to flowchart 600 are the second selection decision points. The initial decision point for the second routing service can be determining whether an on-board navigation unit 136 is enabled in a MVCU 110.

During stage S604, the call center 170 determines if the decision point is positive for the second routing service option. A negative determination during stage S604 indicates that the second routing service option is not viable and the flow proceeds to stage S606 where the second routing service option is eliminated. For example, if the on-board navigation unit 136 is not enabled in a MVCU 110, then using the on-board navigation unit 136 to receive a route is not possible and the on-board navigation unit 136 is eliminated as a routing service option. From stage S606, the flow proceeds to stage S616 and on to stage S408 of the originating flowchart 400. A positive determination during stage S604, indicates that the second routing service option is still viable and the flow proceeds to stage S608.

During stage S608, the call center 170 determines if additional decision points must be evaluated before selecting the second routing service option. An additional decision point for the exemplary second routing service option can be determining if the on-board navigation unit 136 has an origin geocode.

If it is determined during stage S608 that all decision points have been evaluated, the flow proceeds to stage S614 where the first routing service option is selected. The flow then proceeds to stage S616 and the flow is directed to stage S408 of the originating flowchart 400.

If it is determined during stage S608 that there are no additional decision points to be evaluated, the flow proceeds to stage S610. During stage S610, the call center 170 determines if the first routing service option was selected. If the call center 170 determines that the first routing service option was selected, the flow proceeds to stage S616 and the flow returns to stage S408 of the flowchart 400 in FIG. 4. The call center 170 will not continue to determine if the second routing service option is viable once the preferred first routing service option is selected.

If the call center 170 determines that the first routing service option was not selected, the flow proceeds to stage S612 where the next decision point is selected by the call center 170 and the flow proceeds back to stage S604. During stage S604, the call center 170 determines if the currently selected decision point for the second routing service option is positive.

Then the flowchart 600 continues cycling through stages S604, S608, S610 and S612 until one of three events occurs: the second routing service option is eliminated at stage S606 by a determination that one of the decision points is negative; the second routing service option is selected at stage S614 by determinations that all decision points are positive; or it is determined during stage S610 that the first routing service option was selected at stage S512 in flowchart 500 of FIG. 5. After any one of these events occurs, the flow in flowchart 600 proceeds to stage S616 and on to stage S408 of the originating flowchart 400.

The description of flowchart 400 in FIG. 4 continues here after the processes of stages S404 and S406 are complete.

During stage S408, the call center 170 determines if a routing service was selected. If flowchart 500 proceeded to stage S512, then the first routing service option was selected. If flowchart 600 proceeded to stage S614, the second routing service option was selected. If a routing service option was selected, the flow proceeds to stage S410 and the flow terminates. The requested route is then supplied to the user in the MVCU 110 according to the normal procedures of the selected routing service.

If the flowcharts 500 and 600 each proceeded through the respective stages of S512 and S614, in which the first and the second routing option are both selected, the first routing service, as the preferred routing service option, is selected by the call center 170. This would only happen if flowchart 500 reached stage S514 after flowchart 600 proceeded to stage S612 from stage S610.

If a routing service option was not selected, the flow proceeds to stage S412 and the call center 170 determines if a third routing service option is available. In some embodiments, the MVCS 100 provides for selecting a third routing service option based on the evaluation of the first routing service option deliverability and the second routing service option deliverability.

If there is no third routing service option, the flow proceeds to stage S414 and the user is notified by the call center 170 that routing service for the requested origin and destination is unavailable.

If there is a third routing service option available, then the flow proceeds to stage S416 and a third routing option is selected. In this embodiment, the third routing service is a default routing service. In that case, the third routing service option is selected and the requested route is then supplied to the user in the MVCU 110 according to the normal procedures of the third routing service. The third routing service can be verbal directions from a communication services advisor 178.

In one embodiment, the third routing service option is not necessarily available and is evaluated in a process flow equivalent to the process flow of flowcharts 500 and 600. A process flow to determine if a third routing option is available occurs immediately after stage S402 at the same time as the process flow in flowcharts 500 and 600. In that case during stage S412, computer readable code can determine if a fourth routing service option is available and proceed to stages S414 or S416 as appropriate depending on the determination regarding the fourth routing service option.

While the embodiments, of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of dynamically selecting a routing service comprising:
   receiving a route request at a call center from a telematics unit via a wireless connection;
   determining a vehicle communication configuration responsive to the request;
   determining map data availability responsive to the request; and
   selecting a routing service option based on the vehicle communication configuration determination and the map data availability determination.

2. The method of claim 1, wherein the routing service option is selected from the group consisting of one or more off-board navigation servers, one or more on-board navigation units, verbal directions from an advisor at the call center and combinations thereof.

3. The method of claim 1, wherein the step of determining a vehicle communication configuration responsive to the request comprises: monitoring a plurality of selection decision points in the determination of the vehicle communication configuration;
monitoring the plurality of selection decision points in the determination of the map data availability; and
wherein the step of selecting comprises:
evaluating a route deliverability of a first routing service option as each of one or more first selection decision points are monitored, wherein the first selection decision points include at least one of the plurality of selection decision points.

4. The method of claim 3, wherein the plurality of selection decision points in the determination of vehicle communication configuration are selected from the group consisting of determining whether an off-board navigation server is enabled in a vehicle, determining whether a transport mechanism is available in the vehicle, determining whether an on-board navigation unit is enabled in the vehicle, and combinations thereof.

5. The method of claim 3, wherein the plurality of selection decision points in the determination of map data availability are selected from the group consisting of determining if an off-board navigation server has an origin geocode comprising a longitude and a latitude associated with a vehicle at the time of the request, determining if an on-board navigation unit has the origin geocode, determining if the off-board navigation server has a destination geocode comprising a longitude and a latitude associated with a vehicle destination, determining if the on-board navigation unit has the destination geocode, determining if the off-board navigation server can calculate the route, determining if the on-board navigation unit can calculate the route, determining if data to initiate a packet session is accurate for the vehicle, and combinations thereof.

6. The method of claim 3, wherein the step of selecting a routing service option further comprises:
selecting the first routing service option based on the evaluation of the first routing service option deliverability.

7. The method of claim 3, wherein the step of selecting a routing service option further comprises:
selecting a second routing service option based on the evaluation of the first routing service option deliverability.

8. The method of claim 3, wherein the step of selecting a routing service option further comprises:
evaluating the route deliverability of a second routing service option as each of one or more second selection decision points are monitored, wherein the second selection decision points include at least one of the plurality of selection decision points.

9. The method of claim 8, wherein the step of selecting a routing service option further comprises:
selecting the second routing service option based on the evaluation of the second routing service option deliverability.

10. The method of claim 8, wherein the step of selecting a routing service option further comprises:
selecting a third routing service option based on the evaluation of the first routing service option deliverability and the second routing service option deliverability.

11. The method of claim 8, wherein the first routing service option is one or more off-board navigation servers and the second routing service option is verbal directions from an advisor.

12. The method of claim 8, wherein the first routing service option is one or more on-board navigation units and the second routing service option is verbal directions from an advisor.

13. The method of claim 8, wherein the first routing service option is one or more on-board navigation units and the second routing service option is one or more off-board navigation servers.

14. The method of claim 8, wherein the first routing service option is one or more off-board navigation servers and the second routing service option is one or more on-board navigation units.

15. A system for determining deliverability of navigation service comprising:
means for receiving a route request at a call center from a telematics unit via a wireless connection;
means for determining a vehicle communication configuration responsive to the request;
means for determining map data availability responsive to the request; and
means for selecting a routing service option based on the vehicle communication configuration determination and the map data availability determination.

16. The system of claim 15, wherein the means for determining comprise:
means for monitoring a plurality of selection decision points in the determination of the vehicle communication configuration;
means for monitoring the plurality of selection decision points in the determination of the map data availability; and
wherein the means for selecting comprise:
means for evaluating a route deliverability of a first routing service option.

17. The system of claim 16, wherein the means for selecting further comprise:
means for selecting the first routing service option based on the evaluation of the first routing service option deliverability.

18. The system of claim 16, wherein the means for selecting further comprise:
means for selecting a second routing service option based on the evaluation of the first routing service option deliverability.

19. A computer readable medium storing a computer program comprising:
computer readable code for receiving a route request at a call center from a telematics unit via a wireless connection;
computer readable code for determining a vehicle communication configuration responsive to the request;
computer readable code for determining map data availability responsive to the request; and
computer readable code for selecting a routing service option based on the vehicle communication configuration determination and the map data availability determination.

20. The medium of claim 19, wherein the computer readable code for determining comprises:
computer readable code for monitoring a plurality of selection decision points in the determination of the vehicle communication configuration;

computer readable code for monitoring the plurality of selection decision points in the determination of the map data availability; and wherein the computer readable code for selecting comprises:

computer readable code for evaluating a route deliverability of a first routing service option as each of one or more first selection decision points are monitored, wherein the first selection decision points include at least one of the plurality of selection decision points.

21. The medium of claim 20, wherein the computer readable code for selecting further comprises:

computer readable code for selecting the first routing service option based on the evaluation of the first routing service option deliverability.

22. The medium of claim 20, wherein the computer readable code for selecting further comprises:

computer readable code for selecting a second routing service option based on the evaluation of the first routing service option deliverability.

* * * * *